(12) United States Patent
Klomp et al.

(10) Patent No.: US 8,723,953 B2
(45) Date of Patent: May 13, 2014

(54) GENERATION OF AERIAL IMAGES

(75) Inventors: Harald Klomp, Uppsala (SE); Jakob Sandström, Uppsala (SE)

(73) Assignee: IMINT Image Intelligence AB, Uppsala (SE)

( * ) Notice: Subject to any disclaimer, the term of this patent is extended or adjusted under 35 U.S.C. 154(b) by 356 days.

(21) Appl. No.: 12/865,747

(22) PCT Filed: Jan. 30, 2009

(86) PCT No.: PCT/SE2009/050101
§ 371 (c)(1),
(2), (4) Date: Nov. 30, 2010

(87) PCT Pub. No.: WO2009/096893
PCT Pub. Date: Aug. 6, 2009

(65) Prior Publication Data
US 2011/0090337 A1    Apr. 21, 2011

(30) Foreign Application Priority Data
Feb. 1, 2008  (SE) ..................... 0800248

(51) Int. Cl.
*H04N 7/18*    (2006.01)
(52) U.S. Cl.
CPC ..................... *H04N 7/18* (2013.01)
USPC ..................................... 348/144
(58) Field of Classification Search
CPC ............................................. H04N 7/18
USPC ................................. 348/41–163
See application file for complete search history.

(56) References Cited

U.S. PATENT DOCUMENTS

| | | | |
|---|---|---|---|
| 5,155,597 A | | 10/1992 | Lareau et al. |
| 6,393,163 B1 * | | 5/2002 | Burt et al. ...................... 382/294 |
| 6,571,024 B1 * | | 5/2003 | Sawhney et al. .............. 382/294 |
| 6,694,064 B1 * | | 2/2004 | Benkelman ................... 382/284 |
| 2001/0038718 A1 * | | 11/2001 | Kumar et al. ................. 382/284 |
| 2003/0076406 A1 * | | 4/2003 | Peleg et al. ..................... 348/36 |
| 2007/0031062 A1 | | 2/2007 | Pal et al. |

(Continued)

OTHER PUBLICATIONS

Han Xiaowei et al., An Approach of Fast Mosaic for Serial Remote Sensing Images from UAV, Fourth International Conference on Fuzzy Systems and Knowledge Discovery (FSKD 2007) 0-7695-2874-0/07 (abstract only).

(Continued)

*Primary Examiner* — Joseph Ustaris
*Assistant Examiner* — Talha Nawaz
(74) *Attorney, Agent, or Firm* — Young & Thompson

(57) ABSTRACT

The method according to the invention gene rates an aerial image mosaic viewing a larger area than a single image from a camera can provide using a combination of computer vision and photogrammetry. The aerial image mosaic is based on a set of images acquired from a camera. Selective matching and cross matching of consecutive and non-consecutive images, respectively, are performed and three dimensional motion and structure parameters are calculated and implemented on the model to check if the model is stable. Thereafter the parameters are globally optimised and based on these optimised parameters the serial image mosaic is generated. The set of images may be limited by removing old image data as new images are acquired. The method makes it is possible to establish images in near real time using a system of low complexity and small size, and using only image information.

17 Claims, 12 Drawing Sheets

(56) References Cited

U.S. PATENT DOCUMENTS

2007/0237420 A1* 10/2007 Steedly et al. ............... 382/284
2007/0286526 A1* 12/2007 Abousleman et al. ........ 382/284
2010/0238164 A1* 9/2010 Steedly et al. ............... 345/419
2012/0114249 A1* 5/2012 Conwell ...................... 382/190

OTHER PUBLICATIONS

International Search Report dated Apr. 20, 2009, from corresponding PCT application.

* cited by examiner

GENERATION OF AERIAL IMAGES

TECHNICAL FIELD OF THE INVENTION

The present invention relates to generation of aerial images, and in particular generation of aerial image mosaics.

BACKGROUND OF THE INVENTION

In aerial imaging the surface of an object is typically imaged using an aerial imaging system freestanding from the object. For example an aerial image can be acquired by aerial photography using a camera. More specifically, aerial imaging can be used to provide an image of the ground using an elevated camera. Aerial imaging is useful in cartography, archaeology, environmental studies, tactical and strategic use by civilian and military intelligence, etc. Commonly an image acquisition system of the aerial imaging system is mounted in a flying vehicle of some kind. Examples of such are satellites orbiting the earth, and helicopters or aircrafts flying over the area to be imaged. Unmanned aerial vehicles (UAV) are also becoming more popular as they become more capable, have an endurance that outperforms manned aircraft and can be operated in harsh, or hostile, environment. Another advantage of the UAV is that aerial imaging readily can be performed in the actual area of interest. Aircraft, and in particular satellites, usually fly over the area of interest in following one direction, which is called a strip.

Each image acquired by the aerial image system usually only shows a small part of the area of interest. An overview of a larger area than can be covered by just one image frame is desirable. Furthermore, visual inspection of only one isolated image frame gives few clues to the orientation and location of the area where the image is taken and a poor overview. An improved overview can be created by stitching images together into one single image, for example an orthographic image where the image is oriented perpendicular to the ground, formed by a mosaic of single image frames. Details can then be provided by zooming in on this mosaicked image. Image stitching can also be used for panorama images by stitching together images from a stationary camera that is panned up and down (change of elevation) and moved from left to right (change of azimuth).

In a conventional aerial imaging system of an aircraft that is over-flying an area in overlapping strips, the images are matched together sequentially within one strip and further, the images of overlapping strips are matched together using so called cross strip matching, in order to generate the aerial image mosaic.

In photogrammetry, which commonly is used to produce topographic maps, geometric properties about objects are determined from photographic images. For example, the three-dimensional coordinates of points on an object are determined by measurements made in two or more photographic two-dimensional images taken from different positions or orientations. The motion described by the orientation and the location of e.g. an aircraft can be divided into two steps. First, the relative orientation of the camera between two consecutive images is determined. This is done by finding corresponding features defined by so called feature points. To correctly orient two images one needs at least four corresponding feature points. Feature selection is today mainly done manually by letting a user click on the two images and select feature points. Next, the 3D motion of the camera, the so called absolute orientation must be determined.

The matching and stitching of images are challenging operations, not least since the alignment of overlapping images to form the mosaic are computationally intensive. Conventional aerial image systems require three dimensional information of the motion of the image acquisition system to be able to perform the stitching. In satellite based acquisition systems this is simplified by having a stable predetermined tangential motion. Also in aircraft the motion pattern of the acquisition system is preferably following a linear or polar coordinate system to simplify the motion control. The motion control can be improved by using GPS signals or the like to determine the position and the altitude of the acquisition system, which also significantly reduces the computing speed of the matching operation. However, to find two neighbouring images in cross strip matching as described in the above it may not enough to use the GPS position. Two images taken from positions close to each other can view two different parts of the ground. This is due to the unknown orientation of the camera. The angular orientation of the acquisition system can be determined using gyroscopes or accelerometers. Moreover high precision cameras are required.

Aerial image systems are limited by the computational power and only a limited number of images can be matched together in a certain time period. The performance of the aerial image system, i.e. speed, image quality and mosaic size, can be improved but at the expense of increased complexity and size of the system.

In a UAV the motion pattern may be irregular, which put even higher requirements on the aerial image system. However, in opposition to the suggested improvements of the system the UAV do not allow any additional payload, rather the aerial image system should be decreased in size, weight, complexity and cost.

SUMMARY OF THE INVENTION

The object of the present invention is to provide aerial image mosaics in a short time. This is achieved by the method as defined in claim 1.

The method according to the invention generates an aerial image mosaic that views at least a portion of a scene, wherein the field of vision of the portion is larger than a single image acquired from a camera can provide. First a set of images is acquired from the scene using a camera. The images are then matched using a combination of computer vision and photogrammetry. The optical flow between consecutive images is established by selective matching of consecutive image pairs from the set of images using tie points. In addition, cross matching of non-consecutive overlapping images pairs from the set of images is performed using feature point descriptors. A motion and structure model is selected using a priori assumption on camera motion and scene properties, and three dimensional motion and structure parameters between image pairs are calculated. The three dimensional motion and structure parameters are implemented on the model to check if the solution is stable. Thereafter the three dimensional motion and structure parameters are globally optimised to make the three dimensional motion and structure parameters converge to one consistent solution for the set of images. Finally the aerial image mosaic is generated using the globally optimised motion and structure parameters.

In the step of selective matching, tie points are preferably selected in each image. Sub pixel coordinates are found for each tie point position and corresponding tie points in each pair of consecutive images are tracked using a feature tracking algorithm.

According to one embodiment of the invention the three dimensional motion and structure parameters can be calculated between consecutive images using the tie points.

In one embodiment of a method of generation of an aerial image mosaic according to the present invention comprises the step of removing outliers, preferably by computing the homography of the feature points.

The set of images may be limited by continuously removing old image data as new images are acquired.

Thanks to the invention it is possible to establish aerial images of large areas in real time using an aerial image system of low complexity and small size.

It is a further advantage of the invention that the high quality aerial image mosaics can be provided in real time without any additional motion control system such as GPS or the like, gyroscopes or accelerometers.

An aerial image system according to the invention is more robust, cheaper, and lighter than conventional systems, which makes it suitable for unmanned aerial vehicles (UAV). Quality images and video sequences can be produced using an inexpensive UAV and off the shelf cameras.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

Preferred embodiments of the invention will now be described with reference to the accompanying drawings, wherein.

DETAILED DESCRIPTION OF EMBODIMENTS

Different methods for generating an aerial image from a plurality of images are known. Usually one image is matched to another by finding a feature in one image and finding the same feature in the other image and then aligning the images to form a larger image. The features are commonly defined by feature points. In photogrammetry one generally relies on high precision metric cameras and the images are orthonormal (i.e. the image nadir and image centre are aligned). Also information about the 3D motion is always known through telemetry data. In panorama image generation there is no (or negligible) translation and only rotation along one or two axis. Both in the photogrammetry case and the panorama image case there are often only one, or maybe two, general degrees of freedom (DOF) and all other motion parameters can be regarded as small. Conventional methods rely on that the motion of the camera and the scene to be imaged is limited and predictable or else the computing power has to be extensive. Neither of the two methods mentioned above generally applies to the case encountered using images from tactical reconnaissance platforms like unmanned aerial vehicles. Aerial image generation using conventional methods would require large resources in terms of time or computing power since the motion is not very predictable.

In principle, the present invention is based on the combination of computer vision and photogrammetry, which allows rotation and translation around all three axes for the camera. Moreover, an aerial image may be generated from an unordered sequence of images using only the information in the images, i.e. without requiring telemetry data and/or predetermined motion patterns.

Figure 1:
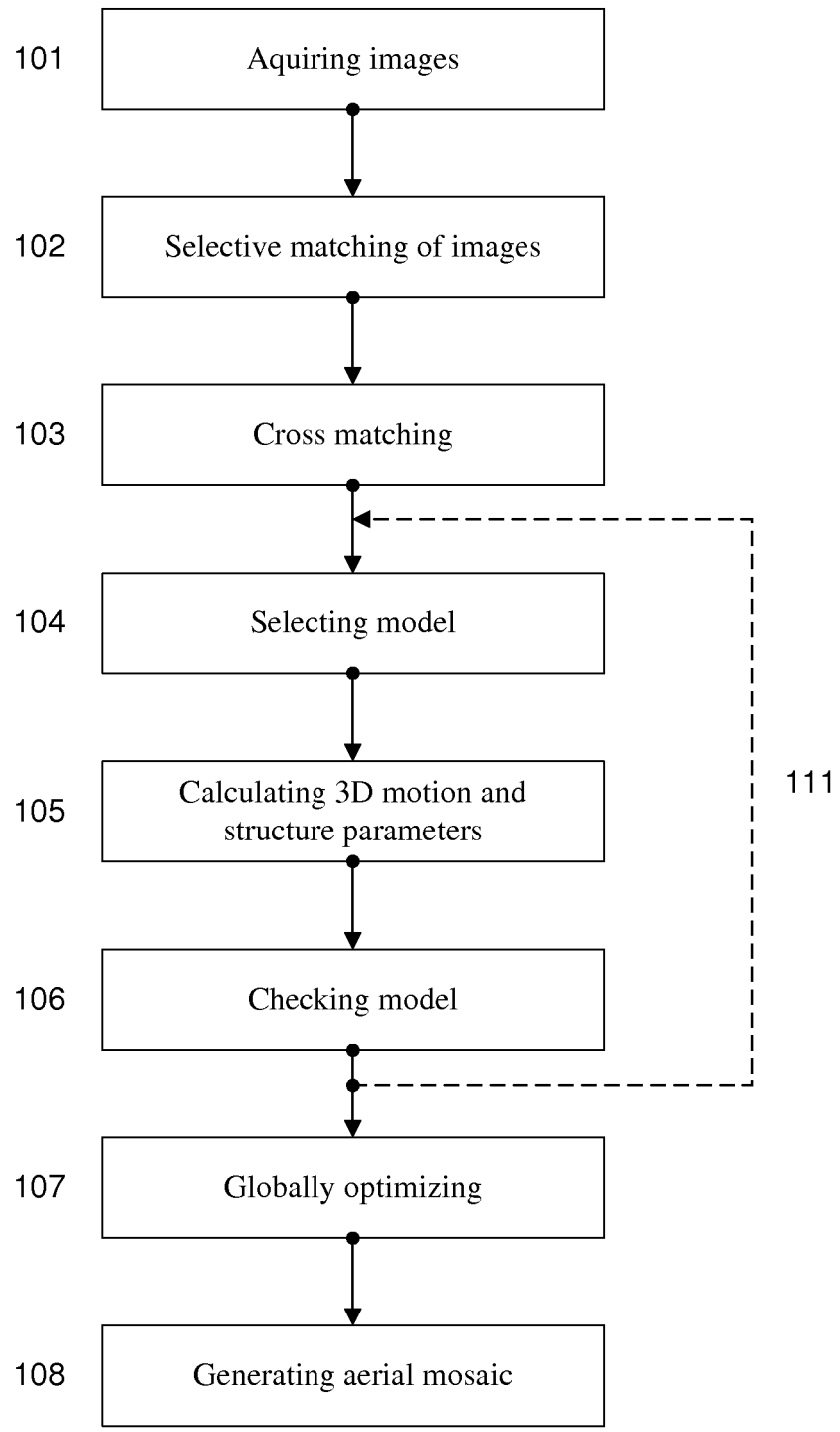
FIG. 1 is a flow chart of the method of generating an aerial image mosaic according to the present invention.

Referring to FIG. 1, according to the present invention a plurality of images, which for example have been acquired in sequence by an image acquisition system such as a camera in a flying UAV, are used to generate an aerial image mosaic. A method of generation of an aerial image mosaic viewing at least a portion of a scene according to the present invention comprises the steps of:

101 acquiring a set of images from the scene using a camera;

102 selective matching of consecutive image pairs from the set of images using tie points of the images;

103 cross matching of non-consecutive overlapping images pairs from the set of images;

104 selecting a motion and structure model using a priori assumption on camera motion and scene properties;

105 calculating three dimensional motion and structure parameters between image pairs;

106 implementing the three dimensional motion and structure parameters on the motion and structure model;

107 globally optimizing the motion and structure parameters to make the three dimensional motion and structure parameters converge to one consistent solution for the set of images; and 108 generating the aerial image mosaic.

Preferably the method generates an orthonormal aerial image mosaic, which means the mosaic is a projection of the portion of the scene to a plane orthonormal thereto. However, the method is not limited to this. The aerial image mosaic can be generated using different viewing angles and it can be projected on other planes than an orthonormal plane.

A tie point is in this application a feature point that is suitable for being tracked in another image after e.g. x- and y-translation and a change of angle of the camera (yaw, pitch roll). Such tie points are commonly also referred to as good feature points.

The selection of a motion and structure model is preferably based on an estimation of the structure of a scene that has been imaged and the motion of the camera, e.g. the scene may be a three dimensional surface (rough) and the camera motion may be essentially linear or the scene may be essentially two dimensional and the camera motion may comprise extensive rotation. By implementing the three dimensional motion and structure parameters on the motion and structure model it can be checked if the solution is stable.

Matching of the images and their corresponding tie points is performed to be able to calculate the three dimensional motion and structure parameters, which describe how feature points move due to the movement either of the scene and/or the camera from one image to another. In the step of selective matching consecutive images are compared, and in the step of cross matching also non-consecutive images are compared. The cross matching is basically analogous to the cross strip matching mentioned above, but the method of the present application does not require ordered arrays of overlapping strips. Alignment is performed using feature point matching. The overlap of consecutive images is typically large, whereas the overlap of non-consecutive images is less likely. Accordingly, different approaches may be used for finding corresponding points between image pairs in the selective matching step and cross matching step. When the three dimensional motion and structure parameters for each image have been calculated the images can be translated to the same coordinate system and then mosaicked together. This translation requires that the model has been accurately selected. Therefore the three dimensional motion and structure parameters are implemented on the model to check if the model is stable.

The step of globally optimizing the motion and structure parameters is desirable since errors in the steps of matching and the calculating step will cause a misalignment of adjacent images. Hence the three dimensional motion and structure parameters may have to be adjusted. This is simplified by the fact that an image only has tie points that matches a limited number of other images, which gives a sparse non-linear equation system that can be solved using numerical methods.

Figure 2:
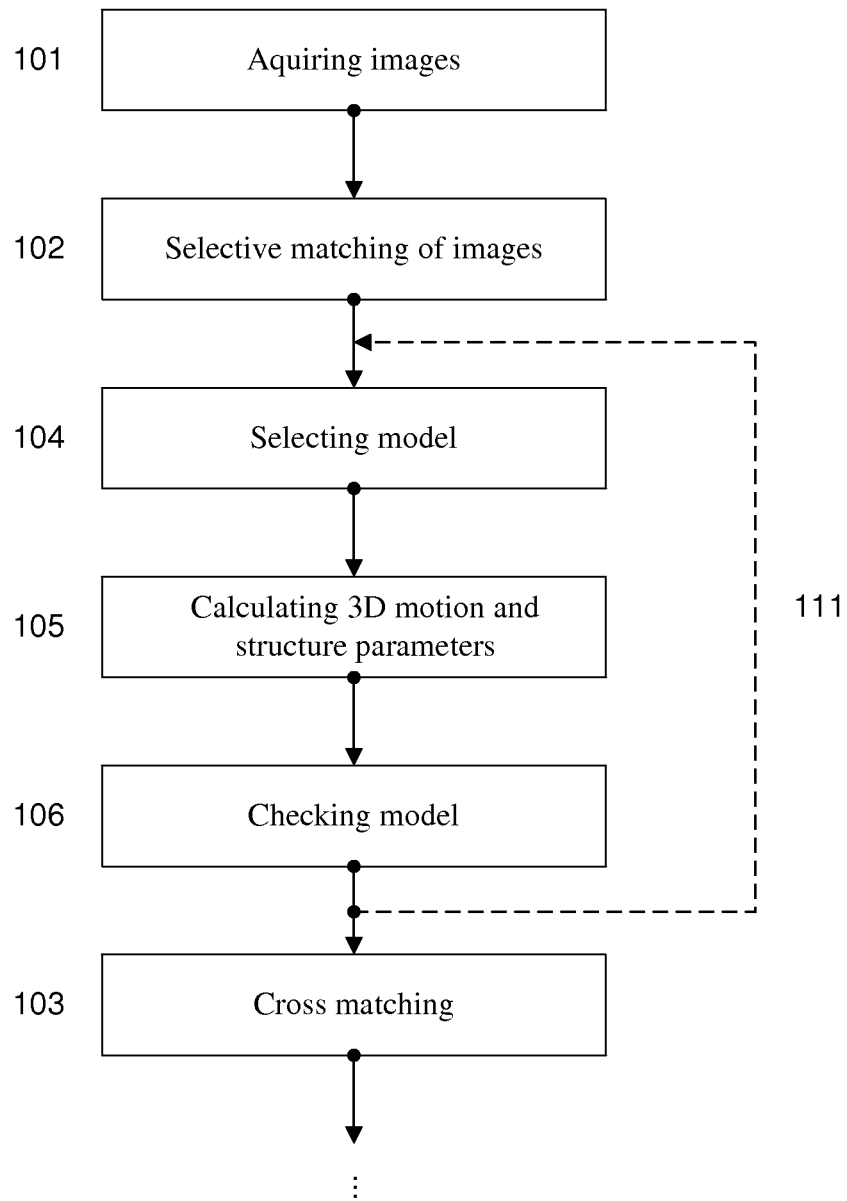
FIG. 2 is a flow chart of one embodiment, wherein motion structure parameters are calculated and compared to the model after selective matching according to the present invention.

When calculated, the three dimensional motion and structure parameters are implemented on the motion and structure model. If the model then is unstable the model may have to be changed. Accordingly one embodiment of the method of the present invention comprises the step of 111 changing the motion and structure model. The step of implementing may be performed in connection to the step of selective matching, but is preferably made in connection to the step of cross matching. The model may have to be changed if there is a large mismatch between the three dimensional motion and structure parameters and the model. The step of changing the motion and structure model after the cross matching is indicated in FIG. 1, but the change of model may alternatively be made after the selective matching step, as illustrated in FIG. 2.

Figure 3:
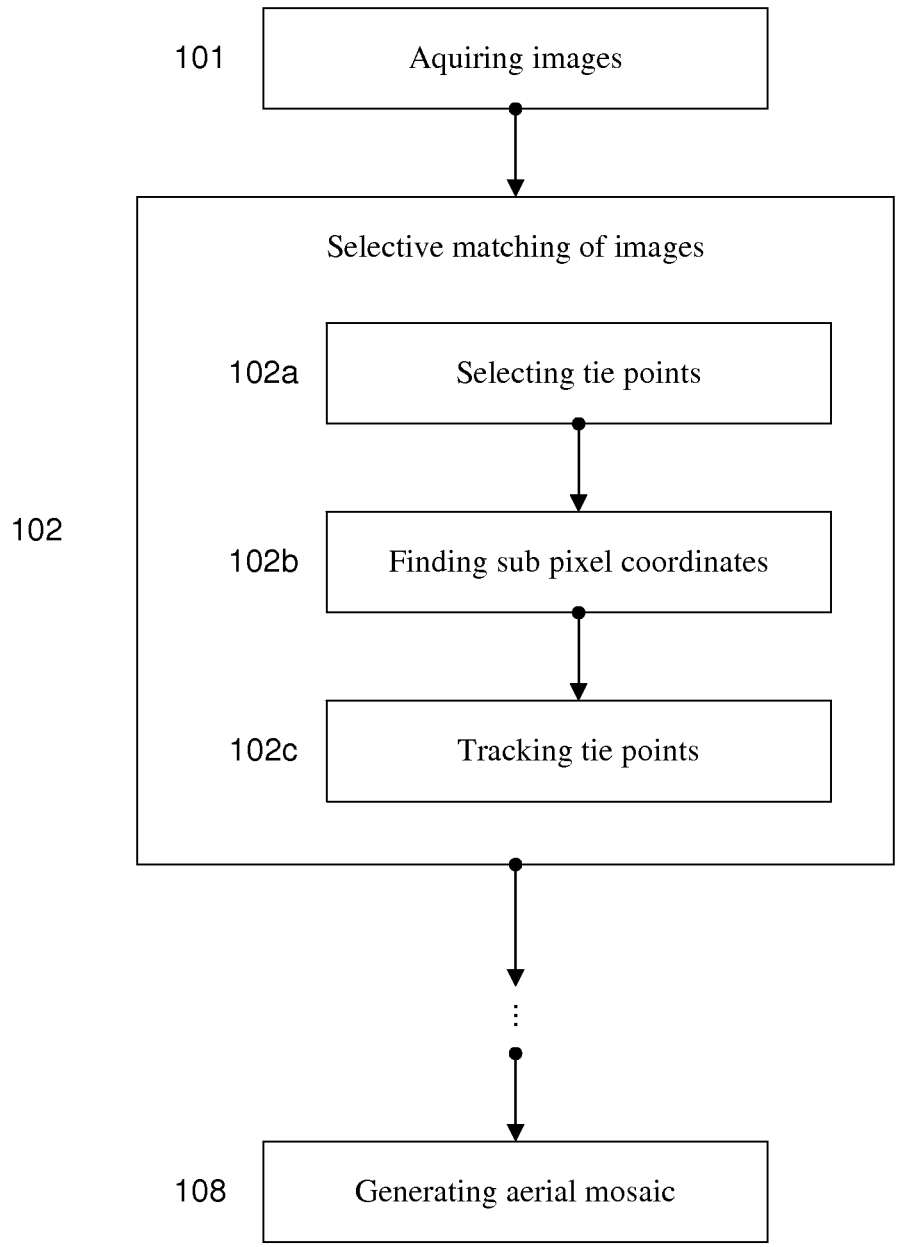
FIG. 3 is a flow chart that illustrates sub-steps of the selective matching step according to the present invention.

Referring to FIG. 3, in one embodiment of a method of generation of aerial image mosaics according to the present invention the step of selective matching 102 further comprises the steps of:

102*a* selecting tie points in each image;

102*b* finding sub pixel coordinates for each tie point position; and

102*c* tracking corresponding tie points in each pair of consecutive images using a feature tracking algorithm.

This gives the so called optical flow in an image, i.e. how different points in an image move due to a movement the scene imaged and/or the motion of the camera.

A texturedness criteria, such as the criteria proposed by Tomasi and Shi (J. Shi and C. Tomasi, Good features to track, Technical report, Ithaca, N.Y., USA, 1993), may be used for selecting the tie points. Basically this is based on that the gradient for a feature point fulfilling the criteria is large in two perpendicular directions.

After finding the sub pixel coordinates corresponding tie points can be tracked using a feature tracking algorithm. The step of 102*c* tracking may comprise tracking using image pyramids. One example of such is a pyramidal implementation of the Lucas Kanade tracker method, however not limited to this.

Figure 4:
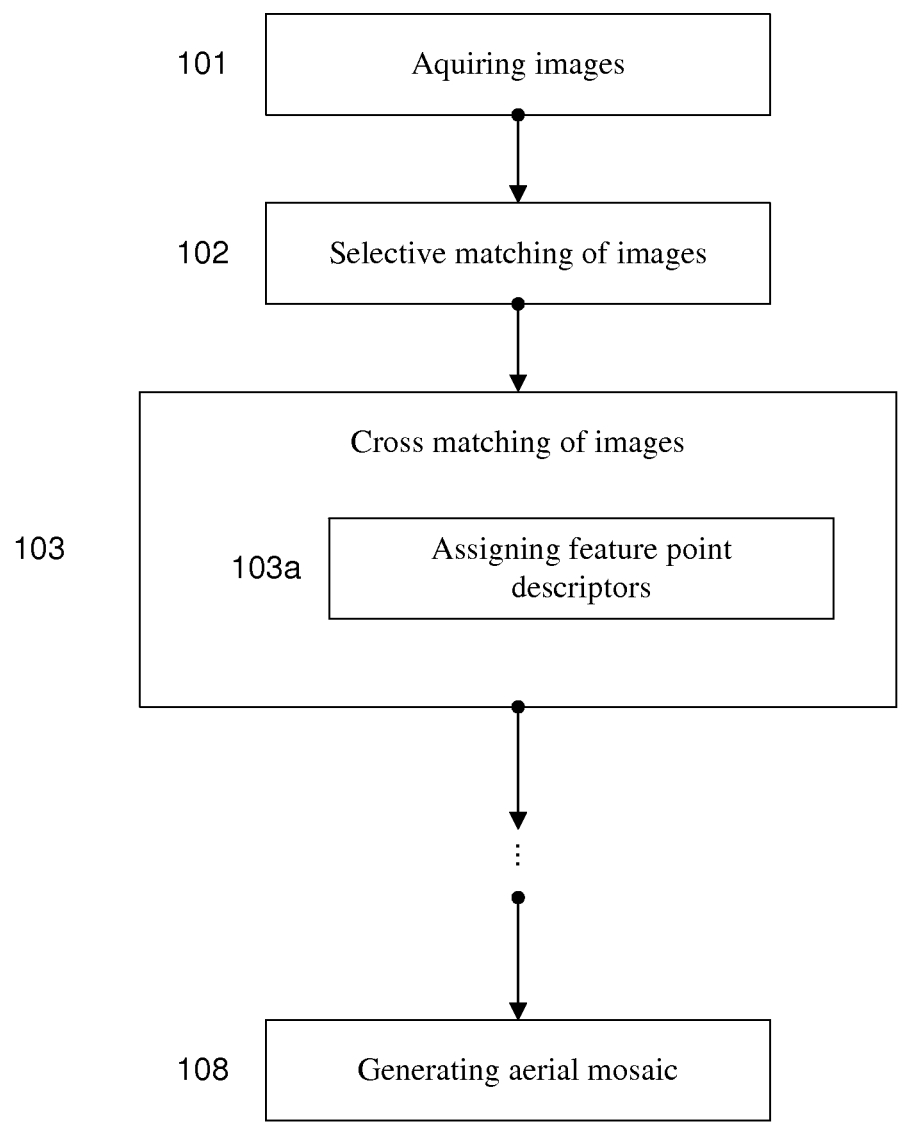
FIG. 4 is a flow chart that illustrates sub-steps of the cross matching step according to the present invention.

Referring to FIG. 4, in one embodiment of a method of generation of a aerial image mosaic according to the present invention the step of 103 cross matching comprises the step of 103*a* assigning the feature point descriptors as further explained below. A feature point descriptor is a vectored means for defining a feature point and in particular a tie point.

Figure 5:
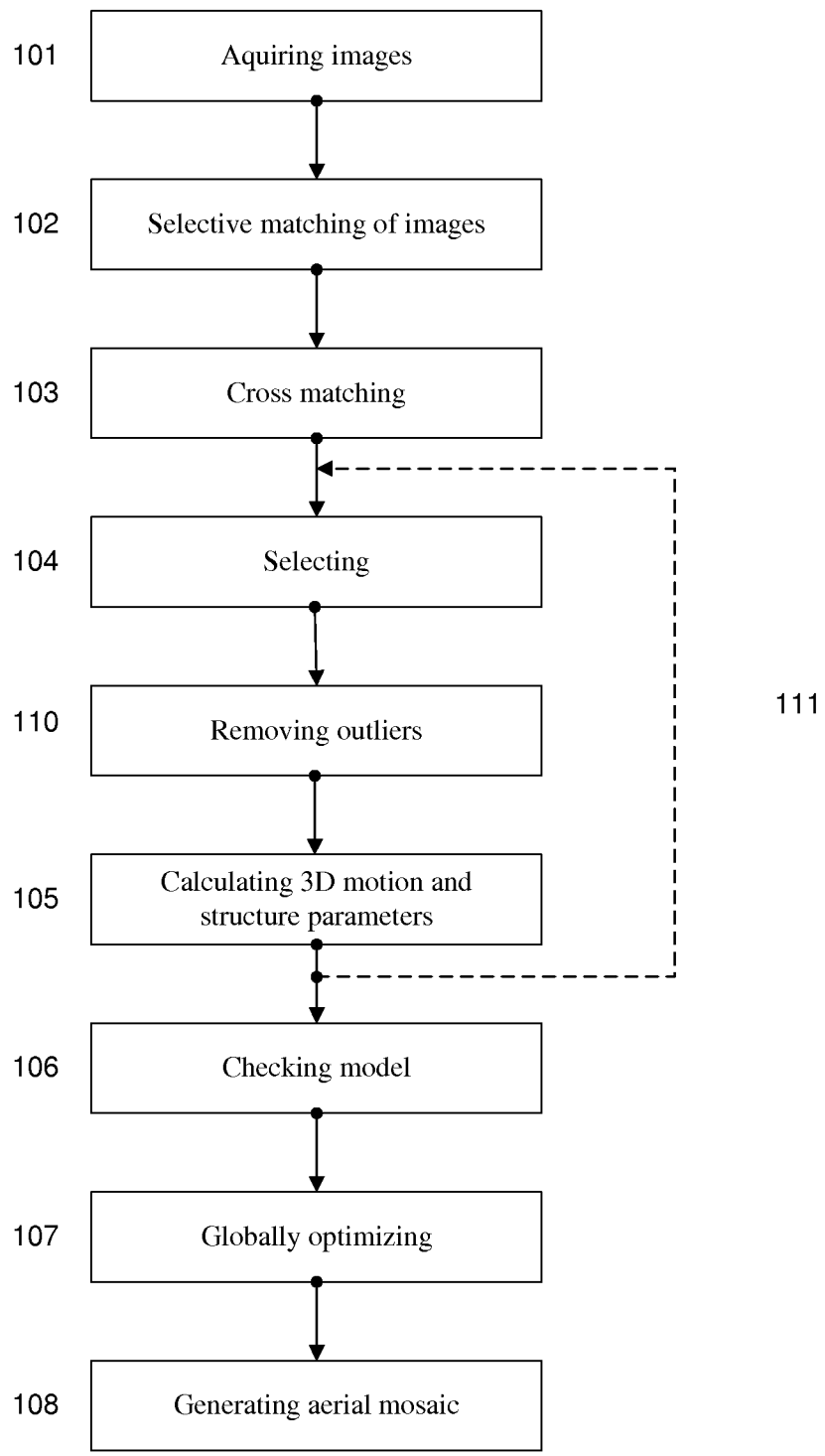
FIG. 5 is a flow chart of one embodiment comprising the step of removing outliers according to the present invention.

Referring to FIG. 5, in one embodiment of the present invention the overlap between images is determined and the method further comprises the step of 110 removing outliers prior to calculating the three dimensional structure and motion parameters. A point outside the overlap is considered to be an outlier and a point inside the overlap is considered an inlier. Consequently the calculations become scaled down.

Figure 6:
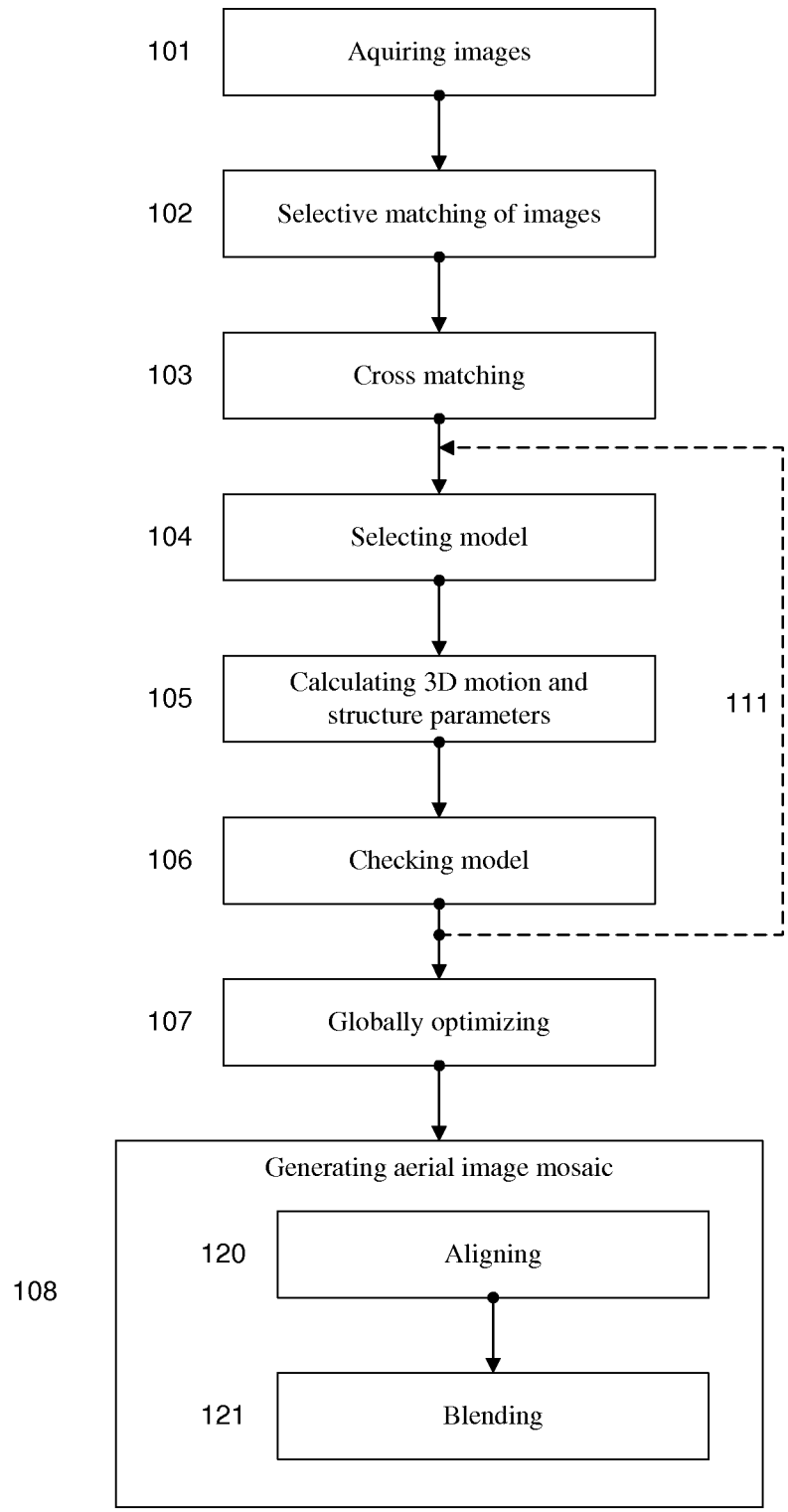
FIG. 6 is a flow chart that illustrates the sub-steps of the step of generating the aerial image mosaic according to the present invention.

Referring to FIG. 6, in one embodiment of the present invention the step of 108 generating an aerial image mosaic further comprises the steps of:

120 aligning images using tie point matching; and/or

121 blending images.

Figure 7:
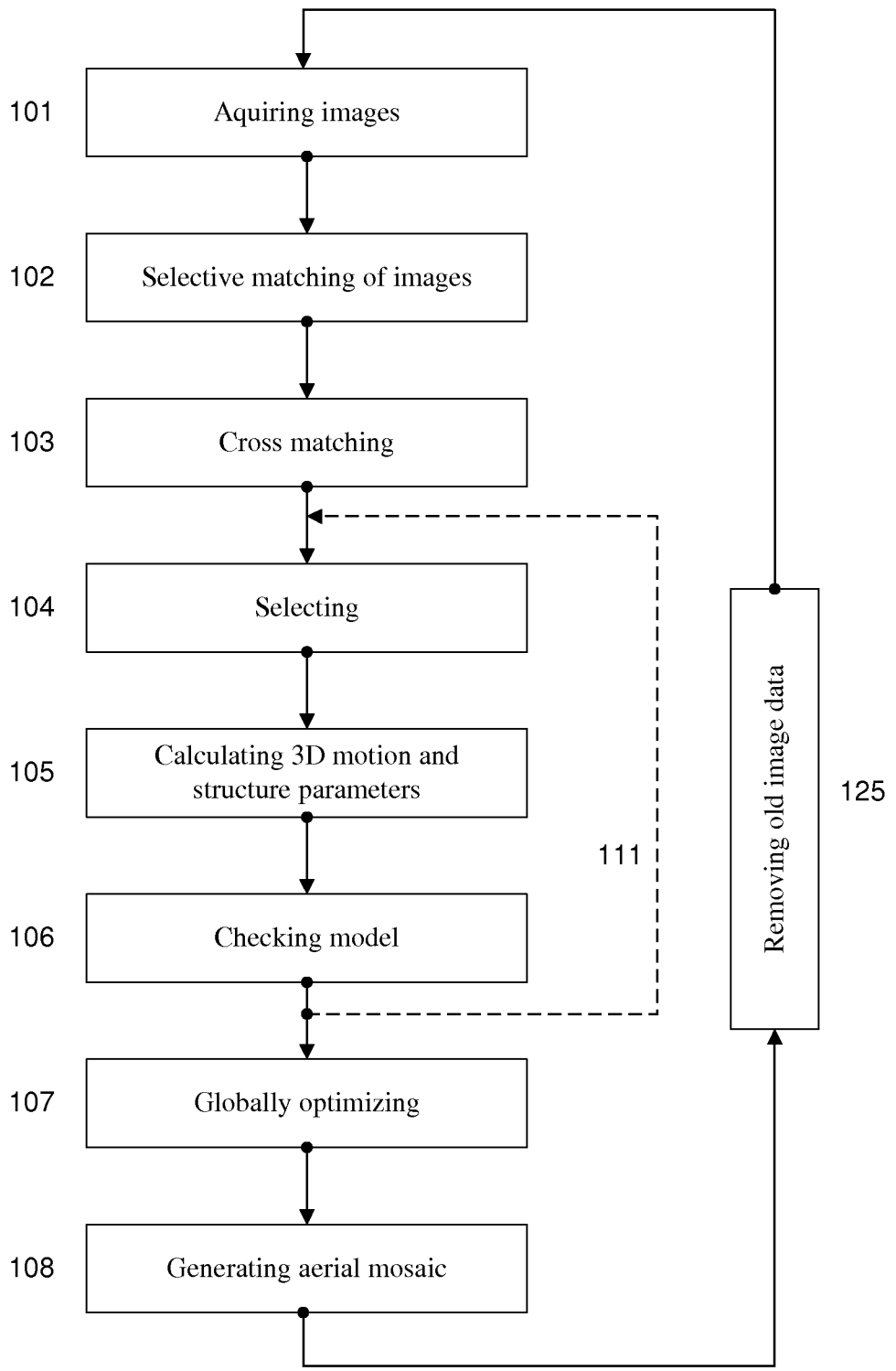
FIG. 7 is a flow chart illustrating the removal of old image data according to the present invention, FIG. 8 schematically illustrates the position of the camera while acquiring images.

Referring to FIG. 7, in one embodiment of the present invention the steps of the method are initialised as soon a number n of images has been acquired. The images are matched and an aerial image mosaic is generated based on the n images according to the invention. Thereafter another image is acquired, i.e. the number of images is n+1. An aerial image is generated based on these n+1 images. The extension of the aerial image is increased until an aerial image based on n+m images have been generated. Thereafter the first image acquired is removed and a new image is added, i.e. the number of images is limited to n+m. In such way the set of images may be limited by continuously removing old image data 125 as new images are acquired.

To further simplify the method of the present invention the camera position and/or orientation can be provided, e.g. by using GPS-information, accelerometers, gyroscopes, etc.

Implementation examples of the method of generating an aerial image mosaic according to the invention that represents different embodiments of the invention are presented in the following. The steps of the method mentioned above are also further described.

Figure 8:
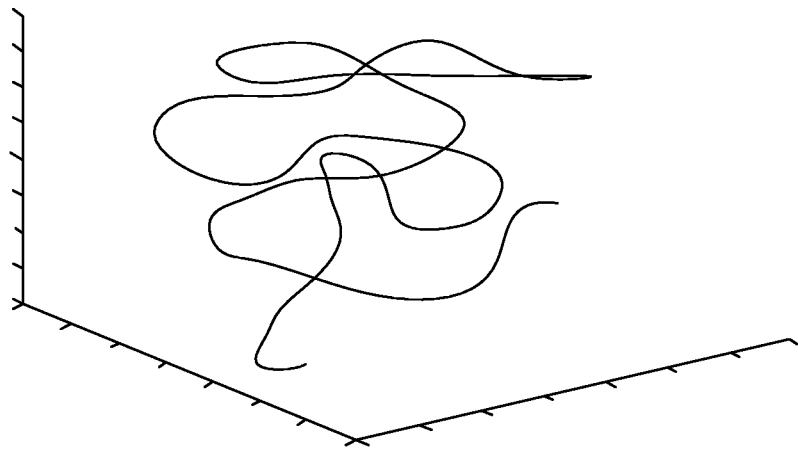

One implementation of the present invention is related to image mosaic generation using tactical reconnaissance platforms, and in particular unmanned aircraft systems, UAS, and unmanned aerial vehicles, UAV. In conventional systems of this kind turbulence commonly cause motion blur and unstable video images. Also a narrow field of view of the cameras can be a limitation. Video interlacing and the non-metric nature of the cameras used also make exact registration of the images difficult. Consequently, the raw imagery acquired is often characterized by unstable orientation, motion blur, high noise levels and significant optical distortions. Hence, extensive processing has to be applied in order to meet the user requirement of high contrast stabilized video and high resolution image mosaics with map compatible geometry. The method of the present invention generates an improved, preferably orthonormal, image mosaic from an unordered sequence of images, which are matched in near real time, in order to generate an overview image covering a larger area than single images. Software instead of hardware is used to achieve the required level of image quality. For example the method of the present invention makes the usual extensive calibration of advanced cameras unnecessary. Simple off the shelf cameras may be used. As illustrated in FIG. 8, one of the challenges in image generation using e.g. a UAS is that the UAS fly in a more or less random pattern. The details of this implementation of the present invention will be explained in the following.

Camera Calibration

Figure 9:
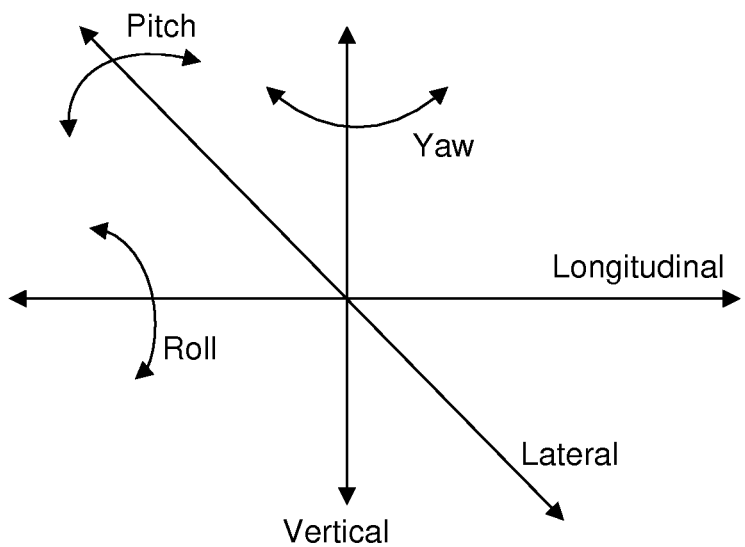
FIG. 9 illustrates the three translation axis and rotation about each of them, FIG. 10 schematically illustrates the finding of sub pixel coordinates according to the present invention, FIG. 11 schematically illustrates interpolation of the sub pixel coordinates, FIG. 12 schematically illustrates tracking of a triangle corner between two frames, FIG. 13 schematically illustrates the iterative process to determine the motion of a point x, FIG. 14 schematically illustrates how local max or min in D are detected by comparing a pixel (marked with X) with all its neighbours (marked with circles), FIG. 15 schematically illustrates the assigning of feature point descriptors according to the present invention, FIG. 16 schematically illustrates the coordinates $x_1$ and $x_2$ of a point in two different image planes, respectively, FIG. 17 schematically illustrates image transformation and overlap, and FIG. 18 schematically illustrates the homography relation of two images $x_1$ and $x_2$.

A camera, either hand held or mounted on an aircraft as in this case, has six degrees of freedom. The camera can be rotated around three axes, i.e. roll, yaw and pitch, as illustrated in FIG. 9, and translated along the same axis (longitudinal, lateral, vertical).

The present invention presents a novel way to solve the 3D viewing problem, i.e. a method of projecting a three-dimensional scene onto a two-dimensional image for display, wherein the scene look like its been taken by an orthographic camera, i.e. all lines should appear to be parallel from the image plane to the ground surface (if that is the target view) and preserving distances.

The camera may be calibrated with regards to the intrinsic camera parameters such as focal length, focal length, pixel size, optical centre and distortion parameters. If the lens distortion is significant the images should be compensated for this.

According to one embodiment of the present invention the method comprises the step of 112 calibrating the camera, using several images of a checkerboard pattern that are 112*a* acquired with different relative orientations of scene and camera. In one embodiment the camera calibration further comprises the sub-steps of:
- with a number of images taken of a m×n,m≠n checkerboard, 112*b* finding the corners inside the checkerboard, m−1×n−1 points;
- 112*c* estimating the intrinsic and extrinsic parameters;
- 112*d* estimating the coefficients of the radial distortion; and
- 112 *e* refining all of the parameters.

Distortion coefficients can be estimated by solving an equation system given by ideal, real normalised image coordinates and parameters that model the distortion using least square method.

The extrinsic parameters determine the cameras orientation toward the outside world. To be able to calculate the extrinsic parameters at least five points are needed. This is studied further below.

Tie Point Detection

The main task for the computer vision is to find matching images and their corresponding tie points. Tracking of tie points is used to find corresponding points between two consecutive images. Matching of feature point descriptors, is preferably used to obtain matching of non-consecutive images.

Optical Flow

An optical flow in an image describes how different points in the image move due to the movement of either the scene imaged or motion of the camera. In this implementation the ground is assumed to be stationary and optical flow is only due to the camera motion. To obtain a stable optical flow of the images tie points of the images are first selected, which subsequently are tracked using a pyramidal implementation of the Lucas Kanade method. To calculate the optical flow there are several established methods. A "good features to track" algorithm proposed by Tomasi and Shi can be used to find the tie points.

Tracking Tie Points

The pixels that make up the image only have finite resolution due to the digital format. When selecting tie points to track, regions in the image that have aperture problems should be avoided. The aperture is the size of the search window used in the tracking algorithm. If the feature observed through the aperture is a straight line or an evenly coloured surface, it may not be possible to determine the correct motion of the feature.

Just any region of the image can not be used for tracking as the aperture problem might occur. The Tomasi and Shi texturedness criteria may be used for selecting tie points. A feature point is said to have good texturedness if the gradient is large in two perpendicular directions.

Selecting corners as features is a common approach to avoid the aperture problem. To detect corners for example the Harris Corner Detector can be used. If the images used are acquired in nature there are very few corners, and hence the Tomasi and Shi [J. Shi and C. Tomasi, *Good features to track*, Technical report, Ithaca, N.Y., USA, 1993] texturedness criteria is suitable for feature detection. For example, trees have strong texture and are therefore good features to track. To be able to decide which points have good texturedness different methods can be used. For example Lowe's Scale Invariant Feature Transform (SIFT) method can be used for finding tie points and assigning feature point descriptors. Another alternative is Speeded Up Robust Features (SURF).

Lowe selects tie point candidates by looking at the second order derivate of the image and calculating the difference between images convolved with two different Gaussian functions, so called difference of Gaussians. Difference of Gaussians used by Lowe is comparable to the calculation of a first order derivative using a Sobel operator; both methods try to find sharp changes in contrast in the gray image.

Tie Point Sub Pixel Location

Figure 10:
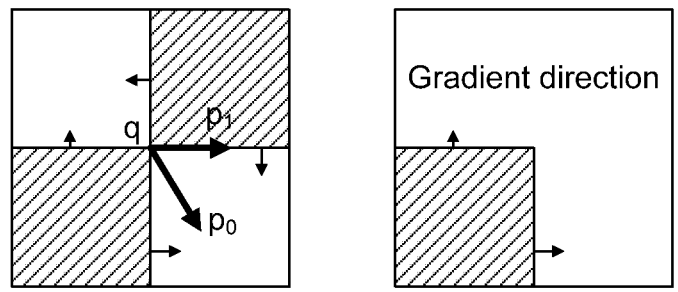

The next step is to find the sub pixel coordinates for each feature point position q that are found for example by using methods as described in the previous section. Referring to FIG. 10, the gradient gives the direction of the steepest decent from a light to a dark area. When looking at a window around the feature location, the different gradients can be identified to find the centre of the feature.

The gradient direction at integer locations $p_i$ is known, but in addition a sub pixel location q where its dark and light pixels meet should be found. To find q the scalar product between the vector ($q,p_i$) and the gradient vector at location $p_i$ can be calculated. When the correct location for q is found the scalar product should be 0. This is made for each $p_i$ around q.

Figure 11:
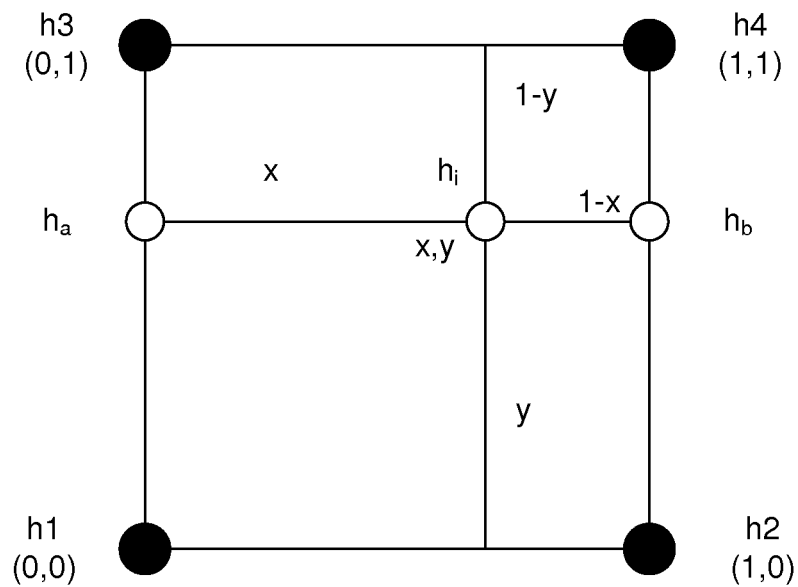

Referring to FIG. 11, bilinear interpolation in three steps can be used to calculate the sub-pixel values:
- obtaining $h_a$ a by linear interpolating between $h_1$ and $h_3$;
- obtaining $h_b$ by linear interpolating between $h_2$ and $h_4$; and
- finally obtaining $h_i$ by linear interpolation between $h_a$ and $h_b$.

Tracking Tie Points in Image Pyramids

When the sub pixel position of the interesting feature point is known, the final step is to track these points e.g. by using the pyramidal implementation of the Lucas Kanade method wherein the image size is decreased from level to level. The calculation of optical flow is then based on the so called constant brightness and contrast assumption between two successive frames.

Figure 12:
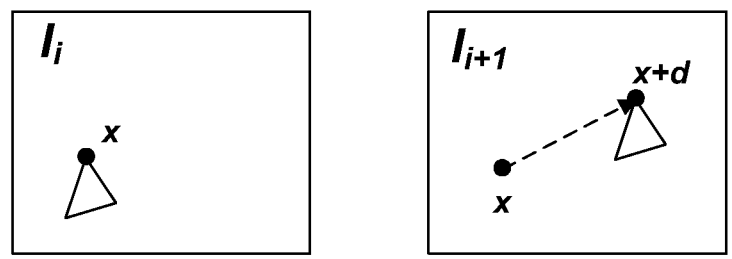
Figure 13:
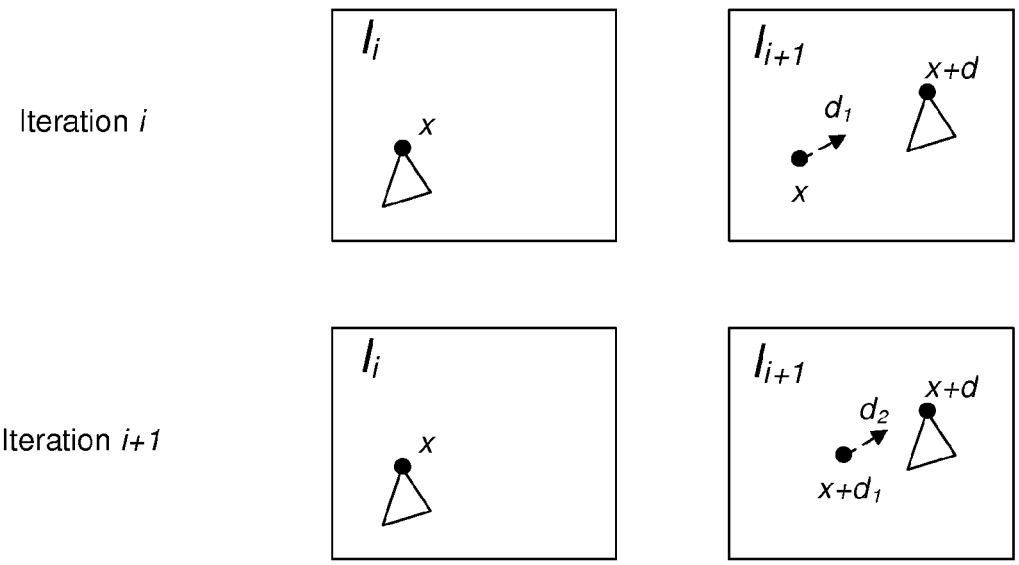

Referring to FIG. 12, two successive frames $I_i$ and $I_{i+1}$, with a displacement of point within a small window W by the displacement vector d, are considered. The constant brightness and contrast assumption results in a difference $$\epsilon = I_i(x) - I_{i+1}(x+d) = I_i(x-d) - I_{i+1}(x).$$

The total difference for the window can be expressed as a sum E of the difference for all x within a small window, optionally including a weight for each pixel to emphasise pixels close to the point x.

Lucas and Kanade propose a gradient descent in the weighted sum square difference function. If E is small there is a good match. The basic idea is to differentiate E with respect to the displacement vector d; and to set $$\frac{\partial E}{\partial d} = 0$$

and solve for the d that minimizes E.

The search is performed from course to fine. A small window can be used with high accuracy. And because a small window in the courser level gives a big window in the fine level the solution is also robust.

The approximation of d in the coarsest (top) level is preferably used as a starting point for the iteration in the level below. This procedure is repeated down the image pyramid until the final solution for d is obtained. Tracking is preferably done at sub pixel accuracy.

Matching Images Using Feature Point Descriptors

In this section it will described how matching of non consecutive images can be performed. Aligning images may be done in broadly two different ways. Either with direct methods by mutual information, sum squared difference or other similar methods. The other approach is using feature point matching. Direct methods are good when only a few degrees of freedom are allowed such as small rotation and small shift, but when there are more complex transformations with more degrees of freedom direct methods become very demanding. Szeliski argues that feature point descriptors have become a very robust and less sensitive to affine changes, noise and changes in illumination.

As mentioned above, there are several methods for finding tie points and assigning feature point descriptors. One method is Lowe's Scale Invariant Feature Transform (SIFT) method. Other methods like SURF can also be used. Lowe uses the word keypoints for SIFT tie points. The SIFT method can be summarized into four steps:

detecting scale-space extrema;
selecting tie points;
assigning an orientation descriptor to each tie point; and
assigning a feature point descriptor for each tie point.

The first two steps are similar to optical flow matching, which is described above, although with a few extensions. The last two steps describe how to assign feature point descriptors to each tie point so that tie points later can be matched. The selection of tie points may have been performed in a previous selective matching step, and in that case those tie points may be used, but may also be reselected in the cross matching step.

Scale-Space Extrema Detection

Figure 14:
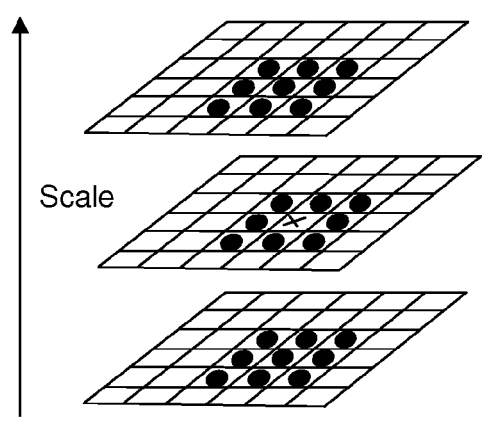

For all matching methods it is important to find tie points to match, i.e. feature points with good texturedness as described above. This can be accomplished by detecting scale-space extrema. Firstly a feature point candidates are selected by looking at the second order derivate of the image and calculating a so called difference of Gaussians, at different scales in the image pyramid derived above. The maxima and minima in the difference of Gaussians are then compared with all values of the difference of Gaussians in a 3×3×3 cube where the "z" direction in the cube is the scale space, as illustrated in FIG. 14. The value is retained only if the value is the smallest or largest among these neighbours.

Feature Point Localization

When the local max and min in the difference of a Gaussian function D is found then the correct feature point location is checked. This can be done by fitting a 3D quadratic function to the feature point by using Taylor expansion up to quadratic terms. Optionally the texturedness is evaluated once more for each good feature point/keypoint found.

To avoid the aperture problem the eigenvalues in the Hessian matrix can be evaluated. The exact values of the eigenvalues are not needed; rather it is important that they don't differ too much.

Orientation Assignment and Feature Point Descriptor

Figure 15:
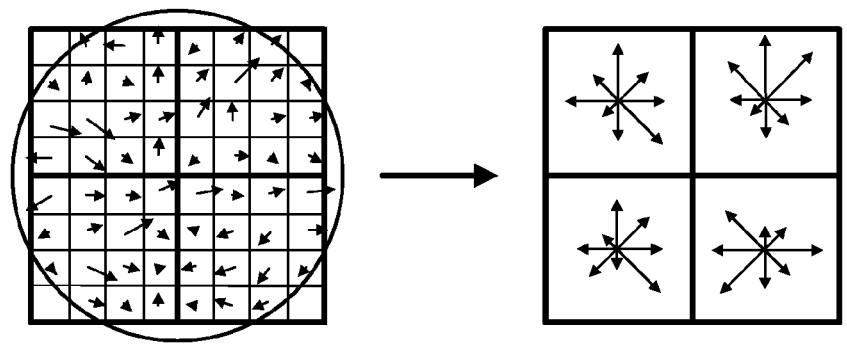

The final step is to assign a feature point descriptor to each feature, as illustrated in FIG. 15. In order to make the feature point descriptor rotation invariant Lowe assigns an orientation descriptor to each feature first and then assigns the feature point description relative to this orientation.

Epipolar Geometry

The following section is related to the geometry and matrix calculation necessary to extract three-dimensional (3D) information from two-dimensional (2D) images. Firstly, relationships between the cameras and feature points drawn from stationary 3D scenes are established. These scenes are built by putting two viewers (or cameras) in two different positions overlooking the same set of 3D points. For now, it may be assumed that the images indeed see the same 3D points. Two images can be matched together even if they view different 3D points. A probabilistic model, which is described below, may be used to separate false matches from correct ones. The step from feature detection to feature matching is a step from 2D image formation to three dimensions. The relationship between the 3D coordinates of a point and the camera frame can be expressed by a rigid-body transformation.

Two very useful transformation matrices for the relative pose of cameras and the camera frame will are discussed below. A quick presentation of different transformations with different degrees of freedom will be given. Finally, algorithms for retrieving homographies, transformation of camera frames, and fundamental and essential matrices, encoding the relative pose of cameras, will be given. It is intuitive to speak of x and y pixel coordinates when dealing with image frames. In 3D space and when dealing with a large number of feature points the notation $x_i$ and $X_i$ where i denotes the camera will be used, e.g. the points are given in the respective cameras coordinate system with the camera set as the centre. Capital letters denotes 3D coordinates and lower-case denotes image plane coordinates.

Fundamental and Essential Matrix

Figure 16:
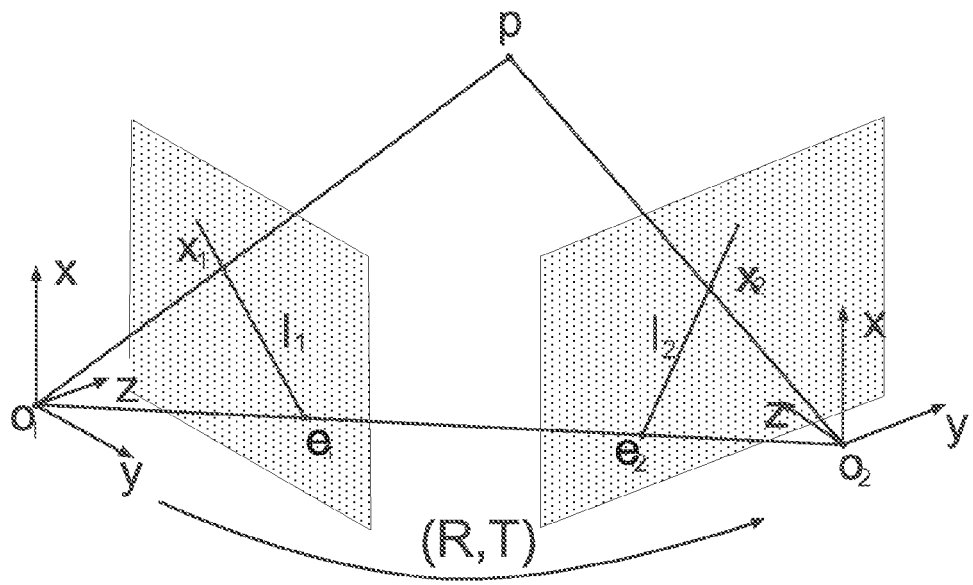
Figure 17:
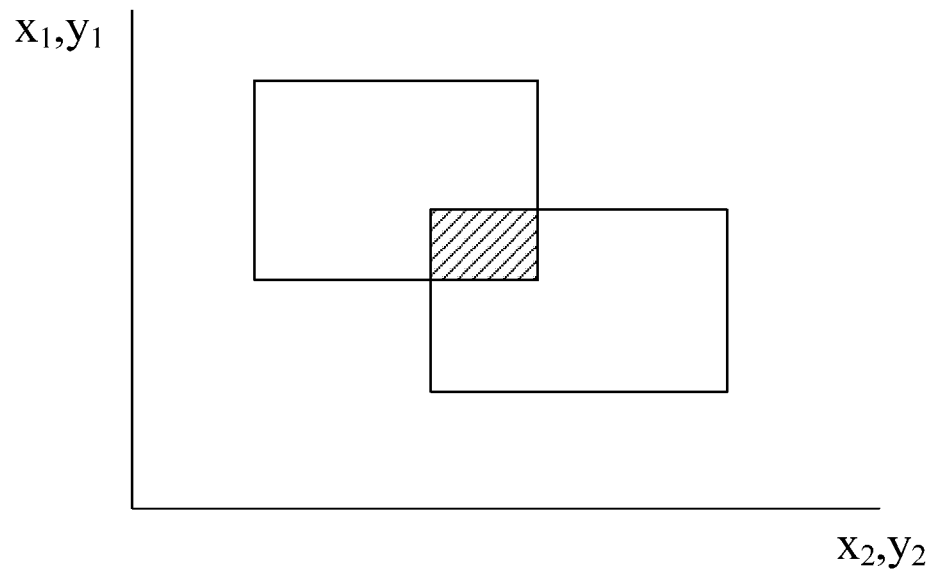

Referring to FIG. 16, if one of the cameras represents the world frame, the other is positioned and orientated by a Euclidean transformation (R, T). The point p in 3D coordinates, $X_i$, i=1,2, relative to the two cameras, denoted 1 and 2, can then be expressed by the following constraint:

$$X_2 = RX_1 + T, (X_1, X_2) \in \mathfrak{R}^3,$$

where R is a rotation matrix, and T a translation vector. $x_1$ and $x_2$ are the coordinates of the point P in the camera image planes found in FIG. 16. The camera image plane or frame is the hatched area in FIG. 16I. Then $X_i = \lambda_i x_i$, where $\lambda_i$ is a scale factor. Inserted in the equation above the result is $$\lambda_2 x_2 = R\lambda_1 x_1 + T.$$

The equation may be pre-multiplied with $x_2^T$ and to get what is generally called the epipolar constraint:

$$x_2^T \hat{T} R x_1 = 0,$$

where $\hat{T}$ is the skew-symmetric matrix associated with T. The scale $\lambda_1$ is dropped since it is larger than 0. The geometric interpretation of the epipolar constraint is that the center of the camera, the point p and its projections all lie in the same plane. The matrix $$E = \hat{T} R \in R^{3 \times 3}$$

is called the essential matrix and encodes the relative pose between the two cameras. The epipolar constraint can also be given in the uncalibrated case:

$$x_2^T F x_1 = 0, F = K^{-T} E K^{-1},$$

where K is the intrinsic camera parameters and F the fundamental matrix. The terms calibrated or uncalibrated data point out if there is access to the intrinsic parameters, e.g., if the camera has been calibrated.

The eight point algorithm is a linear technique created by Longuet-Higgins by which the fundamental (F) or essential matrix (E) can be calculated depending on if the data is calibrated or uncalibrated. In order for the eight-point algorithm to give a unique solution (up to scalar factor) for the camera the camera intrinsic parameters must be known.

Transformation and Planar Homography

In order for the eight-point algorithm to give a unique solution (up to a scalar factor) for the camera motion, it is crucial that the feature points in 3-D be in a general position. When the points form certain degenerate configurations, the solution might no longer be unique. This occurs when all the feature points lie on certain 2-D surfaces, called critical surfaces. Many of these critical surfaces occur rarely in practice and their importance is limited. However, 2-D planes, which happen to be a special case of critical surfaces, are ubiquitous in man-made environments and in aerial imaging. Therefore, if one applies the eight-point algorithm to images of points all lying on the same 2-D plane, the algorithm will fail to provide a unique solution. On the other hand, in many applications, a scene can indeed be approximately planar (e.g., the landing pad for a helicopter) or piecewise planar (e.g., the corridors inside a building).

The ground surface may be assumed to be flat. This is not perfectly true, but from high altitudes a difference in altitude is considered small and is handled as noise in the calculations.

The homography H introduces a map between points in one image to another $$x_2 \cong H x_1$$

where ≅ indicates, as previously, equality up to scale. H also denotes a linear transformation from $X_1$ to $X_2$ where $X_i$ are the coordinates of the point p represented by $x_i$ with respect to the camera frame i. If $N^T = [n_1, n_2, n_3]$ denotes the unit normal vector of the plane P where the point p: $X_1 = [X, Y, Z]$ is found, see FIG. I, and $X_i$ denote the 3D coordinates of the point p relative to the camera frame i, then the plane can be written as $$N^T X_1 = n_1 X + n_2 Y + n_3 Z = d \Leftrightarrow 1 = \frac{1}{d} N^T X_1.$$

The coordinate transform may be written as $$X_2 = R X_1 + T = R X_1 + T \frac{1}{d} N^T X_1 = \underbrace{\left( R + \frac{1}{d} T N^T \right)}_{H} X_1,$$

giving a geometric interpretation of the planar homography H. The homography can be computed using the four-point algorithm.

Linear Conformal Transformation or Four Parameter Transformation

Figure 18:
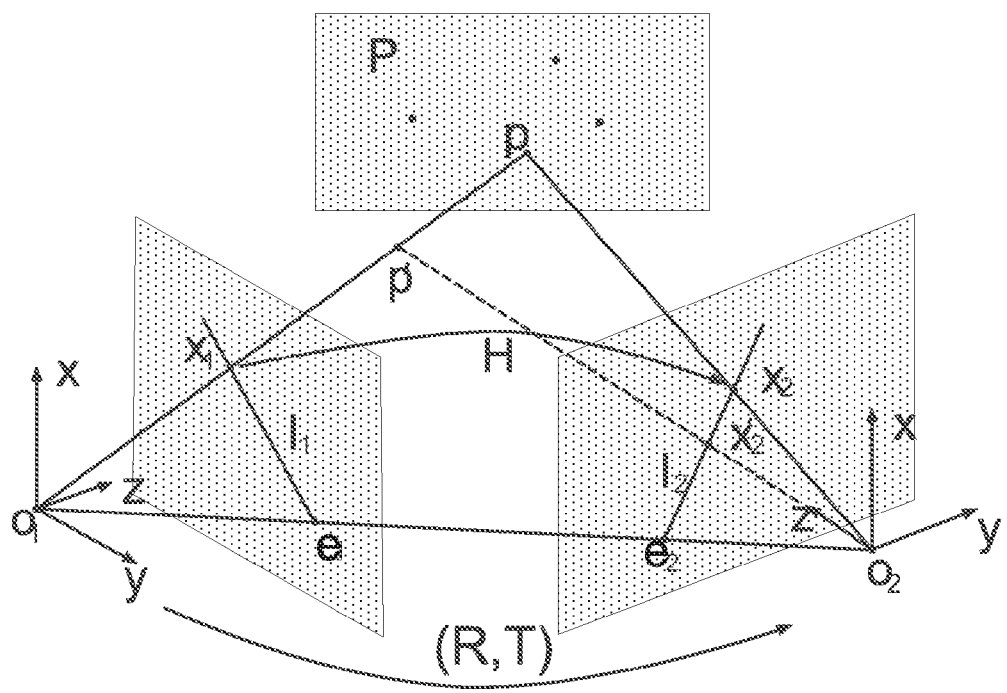

The linear conformal transformation is used to determine the overlap between two images. Only points in the overlap are considered in the geometric model. Points outside the overlap cannot match and are automatically considered outliers. The homography of points in the overlap is computed. A point that conforms to this homography is then considered an inlier and all other points become outliers. The transformed points of a first image that lie within the overlapping region are simply the points that lie within the borders of a second image, as illustrated in FIG. 18.

Image Matching

Image stitching consists generally of two steps: first the images have to be aligned and second they are blended together. Aligning the pictures requires that features successfully can be matched to one another. Once there are reliable features selected it is possible to establish correspondences between two separate images and also estimate the camera displacement. Two commonly used approaches are RANSAC and LMeds, where RANSAC seems to be the de facto standard today. RANSAC stands for Random Sample Consensus. The main idea behind RANSAC is to use a minimal number of points from a set of data points with unknown quality, which may be selected and refined using feature point descriptors like SIFT, to estimate some given model, and then count how many of the remaining data points that are compatible with the estimated model. A point is considered an inlier if it is considered compatible with the estimated model and an outlier if not. A best model with the most inliers is iteratively found. In the case of using the eight-point method, by calculating the relative pose between two cameras. Two points are considered compatible if they fall within a given threshold of satisfying the epipolar constraint $$x_i^{jT} F x_2^{j} = 0,$$

where F is the estimated fundamental matrix and j denotes the current feature evaluated. If, however, we have access to the parameters of a calibrated camera, five points are sufficient to determine the essential matrix. An efficient combination of RANSAC and the use of a five-point algorithm has been suggested by Nister. The quality of the reputed matches is assessed by counting the number of inliers, e.g. the number of pairs for which some residual error is less than a given threshold, τ. Using RANSAC not only gives an estimate of the overlap between the images in the sequence but also the best approximation of the fundamental matrix for each overlapping image pair. With access to the intrinsic parameters of the camera, it is possible to retrieve the essential matrix.

RANSAC—Random Sample Consensus

RANSAC is an approach for fitting a model to experimental error prone data and was introduced by Fischler in 1981. In the process of image matching error-prone feature detection algorithms may have an unknown number of miss-matched features. The range differs from one or two percent for images with low detail or smoothed surfaces such as the figure above to 100 percent for mismatched images with high detail repetitive structures such as large forest areas. RANSAC improves the interpretation of the data and smooth the resulting output.

Typically the feature detection algorithm, e.g. feature matching such as SIFT, proposes a gross-percentage mismatch. Actually there is no knowledge about the image overlap between two images and they might even not be anywhere near the same target area. Classical methods, such as least square or optimization strategies, based on all of the presented data, depend on the assumption that the error is related to the size of the data pool and therefore will be smoothed sufficiently in the process. In many practical estimation problems this assumption does not hold, since the data contains uncompensated errors. It is also intuitive to divide the errors made by the feature detection algorithms into two groups: classification and measurement errors. The classification errors are incorrectly identified feature correspondences while the measurement errors are correctly identified correspondences but the feature locations are miscalculated by some small error. Measurement errors can be smoothed by averaging using least square or some other proper algorithm while classification errors will have a huge negative impact on the result. The method comprises the steps of:

- providing a set of data points $P_1$ and $P_2$ corresponding to matched feature points in image 1 and 2 and a given threshold;
- randomly selecting a subset of seven points, calculating the fundamental matrix $F_k$ using the 7-point method;
- computing the inliers for $F_k$, a point is considered a RANSAC inlier if $|p_1 \cdot F^T p_2|$ and $|p_2 \cdot F p_1|$ are within the given threshold, e.g. the points and the corresponding epipolar lines all lie in or close to the same plane; and
- iterating a number of times and saving the best fundamental matrix, i.e. the one with the most inliers.

If the best solution has 7 inliers, the result may be returned. If there is more than 7 inliers the fundamental matrix may be recalculated using the 8-point method.

Verification of an Image Match

To determine if the images match a probabilistic model suggested by Brown and Lowe (M. Brown and D. G. Lowe Technical report, Department of Computer Science, University of British Columbia, 2005) may be used. The probability of a feature being an inlier in a correct match is by way of example set to $p_1=0.7$ and in the event of a false match to $p_0=0.01$, e.g., if there is a correct match then it is very probable that the main part of the set of feature point matches will conform to the geometric model, while in the case of a false image match the geometric model will hold true for a very small set of feature points. If there is a false image match, but a sufficiently large set of feature point matches so that the image pair has to be evaluated, a common case when dealing with images of e.g. forest areas since the large repetitive structure generates many features, most of them similar, then the feature points can be considered almost randomly scattered across the images. It is highly unlikely that a large part of this randomly scattered set of feature points should conform to some geometric model.

It is possible to make better assumptions, e.g. based on navigation system position data such as GPS data. Based on the height over ground (available in e.g. GPS data), the assumption that the ground plane is relatively flat and in possession of the intrinsic parameters of the camera it is possible to generally estimate the area covered by an image, with the generalization that all images are taken orthogonal to the ground. If the expected area is known a threshold for the maximum distance between each image for it to be considered a match can be derived.

Sparse Bundle Adjustment

In the following one example of a sparse bundle adjustment is given. After establishing the corresponding affine transformations between each sub image the images may be aligned. One sub image may be selected as a first sub image and all images can be aligned with respect to this image. However this accumulates errors and the overall result is likely to become very bad.

Rays are the lines formed by the focal point and the image coordinates. The 3D points are located somewhere on these rays. Recovering the 3D structure is done by intersecting at least five rays from two successive images. In this implementation there may be hundreds of images and thousands of 3D points which all should be combine into one globally optimized image. Images are taken in some sequential fashion. Each image overlaps with one or more images in the sequence. Two successive images in the sequence are most likely to be related with some overlap, especially because images are taken with typically one second interval. The flight pattern of the UAS is such that the same area is imaged several times in so called strips. Images from adjacent strips also have an overlap. The correlation between all these images can be found by using SIFT feature matching together with RANSAC and the co-planar equations as described above.

When the corresponding features between a given set of images are known, the 3D shape and motion for each pair of images may be found. Ideally these computed structures and motion parameters between image pairs should all converge to one global consistent view of the camera motion and the 3D structure for the features. However, this is usually not the case as systematic errors will sum up and make two adjacent strips intersecting incorrect. To solve this problem all structure and motion parameters should be adjusted simultaneously. This problem can actually be solved by exploiting the fact that each image is only related to a limited set of other images. This generates sparse non-linear equation systems which can effectively be solved by using numerical methods. Non linear equations can either be solved by using e.g. gradient descent or Gauss-Newton methods. By way of example, Levenberg-Marquardt combines these two methods by using gradient descent but when the Jacobian is singular it switches to Gauss-Newton. Sparse matrices are matrices where only the nonzero values are stored. The motivation to this is to save storage space and to speed up computations on these matrices. For example multiplying two sparse matrices only requires evaluation of all non-zero entries in the matrices. If the matrices were stored as non sparse matrices it would have been necessary to compute and evaluate many 0·0 entries. In the following the calculation of the error function is presented. Further the sparse structure of the equation systems is shown and how this can be used to effectively solve the equations using the Levenberg-Marquardt method. Bundle Adjustment is covered in both 3D computer vision and photogrammetric. Most of the notation used is derived from Brown.

Residual and Error Function

The residual e between two images is calculated by using the projection function. Then the sum of squares of all the residuals is minimized. Each image i matches a limited set of other images I and where X are the 3D coordinates for the feature points.

$$e = \sum_{i \in I} \sum_{j = X(i)} f(r_{ij})^2$$

where $r_{ij}$ is given by $$r_{ij} = m_i - u_{ij},$$

where $m_i$ is the measured feature position in the images and $u_{ij}$ the 3D point $X_j$ projected onto image i given by the collinear equation:

$$u_{ij}=K_i(R_iX_j+t_i)$$

Because the error function is quadratic we need some safeguard against outliers. This can be done by limiting the error function. Brown suggest the following Huber robust error function.

$$f(x)=\sqrt{g(x)},$$

where $$g(x) = \begin{cases} |x|^2, & \text{if } |x| < \sigma \\ 2\sigma|x| - \sigma^2, & \text{if } |x| \geq \sigma. \end{cases}$$

Brown suggests that σ is set to 3 standard deviations of the current residual error.

Sparse Block Bundle Adjustment

After establishing the error function for the residuals the error function is minimize for all the images simultaneously. The error function has three parameters. First the camera motion R and t, then the camera intrinsic parameters K and then the structure parameters which are the 3D points X. To minimize the non-linear least square equation a linear approximation has to be made e.g. by doing a first order Taylor expansion around a given starting point. The Levenberg-Marquardt method can cope with the situation when the Jacobian J becomes singular by adjusting the damping factor σ. The Levenberg-Marquardt algorithm is an iterative algorithm with the iteration step $$\Phi=(J^TJ+\sigma C_p^{-1})^{-1}J^Tr,$$

where J is the Jacobian of r derivated with respect to the parameter vector $$\Phi=(\Theta,X)$$

and $$\Theta=(K,R,t).$$

Although the present invention has been described in terms of flying vehicles carrying the aerial image systems it is not limited to this. For example the generation of aerial image mosaics may be performed underwater using boats or submarines.

While the invention has been described in connection with what is presently considered to be the most practical and preferred embodiments, it is to be understood that the invention is not to be limited to the disclosed embodiments, on the contrary, is intended to cover various modifications and equivalent arrangements within the appended claims.

The invention claimed is:

1. A method for generating an aerial image mosaic viewing at least a portion of a scene, the method comprising the steps of:
    acquiring a set of images from the scene using a camera;
    selective matching of consecutive image pairs from the set of images using tie points, each tie point having a large gradient in two directions of the image;
    cross matching of overlapping non-consecutive images pairs from the set of images using feature point descriptors;
    selecting a motion and structure model using a priori assumption on camera motion and scene properties;
    calculating three dimensional motion and structure parameters between image pairs, said three dimensional motion and structure parameters describe how feature points move due to movement of the scene and/or movement of the camera;
    implementing the three dimensional motion and structure parameters on the motion and structure model;
    globally optimizing the three dimensional motion and structure parameters to make the three dimensional motion and structure parameters converge to one consistent solution for the set of images; and
    generating the aerial image mosaic.

2. The method according to claim 1, wherein the step of selective matching comprises the steps of:
    selecting tie points in each image;
    finding sub pixel coordinates for each tie point position; and
    tracking corresponding tie points in each pair of consecutive images using a feature tracking algorithm.

3. The method according to claim 1, wherein the step of calculating the three dimensional motion and structure parameters comprises calculating first three dimensional motion and structure parameters between consecutive images using the tie points.

4. The method according to claim 1, wherein the step of cross matching comprises the step of assigning feature point descriptors.

5. The method according to claim 4, wherein the step of calculating the three dimensional motion and structure parameters comprises calculating second three dimensional motion and structure parameters between non-consecutive images using the feature point descriptors.

6. The method according to claim 5, further comprising the step of:
    removing outliers preceding the step of calculating three dimensional motion and structure parameters.

7. The method according to claim 1, wherein the step of globally optimizing comprises bundle block adjustment.

8. The method according to claim 1, further comprising:
    changing the motion and structure model.

9. The method according to claim 1, further comprising the step of:
    calibrating the camera, including the sub-steps of:
        acquiring images of a checkerboard;
        finding corners of the checkerboard;
        estimating intrinsic and extrinsic parameters;
        estimating coefficients of distortion; and
        refining the intrinsic and extrinsic parameters.

10. The method according to claim 1, further comprising the step of:
    providing camera position and/or orientation.

11. The method according to claim 2, wherein the step of selecting tie points is performed using a texturedness criteria.

12. The method according to claim 2, wherein the step of tracking corresponding tie points is performed using image pyramids.

13. The method according to claim 1, wherein the step of calculating the three dimensional motion and structure parameters comprises Random Sample Consensus (RANSAC).

14. The method according to claim 6, wherein the step of removing outliers comprises the step of computing the nomography of the tie points.

15. The method according to claim 1, further comprising the step of:
    limiting the number of images by removing old image data.

16. The method according to claim 1, wherein the gradient of each tie point is in two perpendicular directions of the image.

17. The method according to claim 1, wherein each tie point is a feature point that is suitable for being tracked in a consecutive image.

* * * * *

UNITED STATES PATENT AND TRADEMARK OFFICE
CERTIFICATE OF CORRECTION

PATENT NO.         : 8,723,953 B2                                                     Page 1 of 1
APPLICATION NO.    : 12/865747
DATED              : May 13, 2014
INVENTOR(S)        : Klomp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 578 days.

Signed and Sealed this

Twenty-ninth Day of September, 2015

Michelle K. Lee
*Director of the United States Patent and Trademark Office*